United States Patent [19]

Kitchens

[11] Patent Number: 4,681,219
[45] Date of Patent: Jul. 21, 1987

[54] ACCESSORY FOR BASS FISHING BOAT

[76] Inventor: Doyle Kitchens, 120 Meandering Way, Del Rio, Tex. 78840

[21] Appl. No.: 794,146

[22] Filed: Nov. 1, 1985

Related U.S. Application Data

[63] Continuation-in-part of Ser. No. 691,381, Jan. 14, 1985.

[51] Int. Cl.⁴ .............................................. B65D 85/00
[52] U.S. Cl. ................................. 206/315.11; 206/373; 206/372; 206/562; 206/564; 211/74; 224/275; 224/281; 224/920; 248/298
[58] Field of Search ................... 206/217, 315.11, 372, 206/373, 376, 377, 427, 557, 562, 563, 564; 211/71, 74, 75, 88; 224/275, 281, 42.45, 42.46, 920; 248/295.1, 297.2, 298, 223.4, 224.4; 229/1.5 H

[56] References Cited

U.S. PATENT DOCUMENTS

| | | | |
|---|---|---|---|
| D. 195,527 | 6/1963 | Gilbert | 200/564 |
| 1,614,550 | 1/1927 | Hass | 248/295.1 |
| 2,897,974 | 8/1959 | Cook | 211/74 |
| 2,926,879 | 3/1960 | Dietrich | 224/42.45 |
| 3,754,664 | 8/1973 | Kotkins | 248/298 |
| 3,842,981 | 10/1974 | Lambert | 211/74 |
| 4,068,760 | 1/1978 | Johnson, Jr. | 211/74 |
| 4,203,373 | 5/1980 | Conti | 248/297.2 |
| 4,458,963 | 7/1984 | Keddie | 312/DIG. 33 |
| 4,500,059 | 2/1985 | Papizan | 224/42.45 |
| 4,533,051 | 8/1985 | Fleming | 206/563 |
| 4,548,348 | 10/1985 | Clements | 229/1.5 H |

FOREIGN PATENT DOCUMENTS 986243  3/1965  United Kingdom ................ 211/74

Primary Examiner—Joseph Man-Fu Moy
Assistant Examiner—David T. Fidei
Attorney, Agent, or Firm—James C. Fails; Wm. T. Wofford; Arthur Zobal

[57] ABSTRACT

A fishing accessory device that holds containers of different sizes and shapes in locations convenient for the fisherman can be removed from one mount with only an upward motion and reinstalled easily on another mount. Once mounted, the device is firmly wedged in place onto the mount. Mounts can be placed in numerous locations throughout a boat. Cavities having inwardly sloping interior walls securely hold a variety of containers that are wedged into place.

20 Claims, 18 Drawing Figures

ACCESSORY FOR BASS FISHING BOAT

This application is a continuation-in-part of application Ser. No. 691,381, filed Jan. 14, 1985.

FIELD OF THE INVENTION

This invention relates to accessories for boats, particularly those types of boats used for recreational activities.

DESCRIPTION OF THE PRIOR ART

The prior art has seen the development of a wide variety of fishing tackle ranging from simple prepared floats and weights used by the creek fisherman to very sophisticated equipment used by the salt water fisherman fishing for game fish. Of the immediate interest are the boats and tackle used by the bass fisherman on small inland lakes. Even this narrow of technology has seen the development of a wide variety of tackle such as sprays for odorizing or scenting the bait, hand tools such as fishing pliers, clippers for clipping fishing line, and containers to hold beverages and odorizers. It has long been desirable that the most frequently used if not all of these pieces of equipment be readily available in a single convenient place on the boat.

The accessories of the prior art include: Papizan, U.S. Pat. No. 4,500,059, Hutmacher, U.S. Pat. No. 4,279,365, Lambert, U.S. Pat. No. 3,842,981, and Korten, U.S. Pat. No. 3,889,805. Papizan discloses a tray for holding fishing lures, a pair of pliers, and a beverage can, but the tray can only be fix-mounted to the underside of the seat. Lambert discloses a gimbaled beverage can holder mounted to a wall, for use in a vibratory environment. Korten discloses a fishing tackle rack made of vertical sheets of foam having vertical channels cut into the foam for purposes of hanging hooks and lures. The vertical channels are widened at regular intervals by shallow circular cavities that may be used to hold spools of fishing line in a horizontal position. Hutmacher discloses a specialized rack hung on the side of a boat that holds specialized fishing floats.

The prior art accessories are deficient in several respects. One disadvantage is that no provision is made for storing or holding containers of different sizes and shapes. Those accessories that can hold containers can only hold one size of cylindrical container, usually a beverage container. This inflexibility is disadvantageous because fishing equipment, particularly odorizers, come in a variety of sizes and shapes different from beverage containers. In addition, those containers that could fit into a holder are not securely held in place, a fact that may present a problem in a nautical environment.

Another disadvantage of the prior art is lack of convenient mounting of an accessory. A conveniently mounted accessory would allow the fisherman to stay in his chair and fish without the need to get up and reach for equipment. Among the most convenient places on the boat is the side of the chair used by the fisherman. The prior art accessories that are mounted to a fisherman's chair are done so in a manner that makes removability of the accessory difficult. Removability is desired for further convenience in case the fisherman wants to change his location on the boat for one reason or the other.

SUMMARY OF THE INVENTION

An object of the present invention is to provide an economical accessory device that will hold a variety of containers and tools conveniently for the user.

Another object is to provide an accessory to securely hold a variety of containers and tools in rough water.

Another object is to provide a mounting mechanism to securely hold the accessory device in rough water.

The invention provides an improved accessory device for a fisherman to conveniently hold containers and tools either near the side of a fisherman, or elsewhere around the boat. The body has a wedge-shaped slot in one side wall that matingly engages a similarly shaped web on a mounting bracket. As the body is pushed down against the mounting bracket, the wedging effect creates a tighter, more secure, fit. The web is kept from sliding out laterally by a retaining plate on the side of the side wall opposite the mounting bracket. The body may also have a mounting cavity centered on the wedge-shaped slot. The interior of the cavity is wedge-shaped. The edges or faces of the retaining plate are shaped to matingly fit into the mounting cavity. An alternative embodiment utilizes the wedge-locking effect of the cavity-retaining plate, without any wedge-locking effect from the slot-web.

The device has a plurality of cavities for holding a variety of containers and tools that are used on fishing boats. The container cavities have inwardly sloping walls to lock containers of various sizes in place by firmly wedging them down. Keyways allow rectangular containers to fit down inside the cavities. Smaller cavities contain hand tools and may provide a hole in the bottom to wedge the tools in place.

DESCRIPTION OF THE PREFERRED EMBODIMENTS

Recreational fishing, especially bass fishing, can be an exciting and entertaining sport. Most bass fishing is done from small boats designed to roam the vast number of fresh water inland lakes. Over the years much equipment has been developed to assist the fisherman in his endeavor. Despite the small size of these fishing boats, most equipment is inconveniently placed. This is due to the fact that a great number of fishing boats are equipped with chairs situated several feet above the deck. Since equipment is placed on the deck, the fisherman must bend over to reach it.

Figure 1:
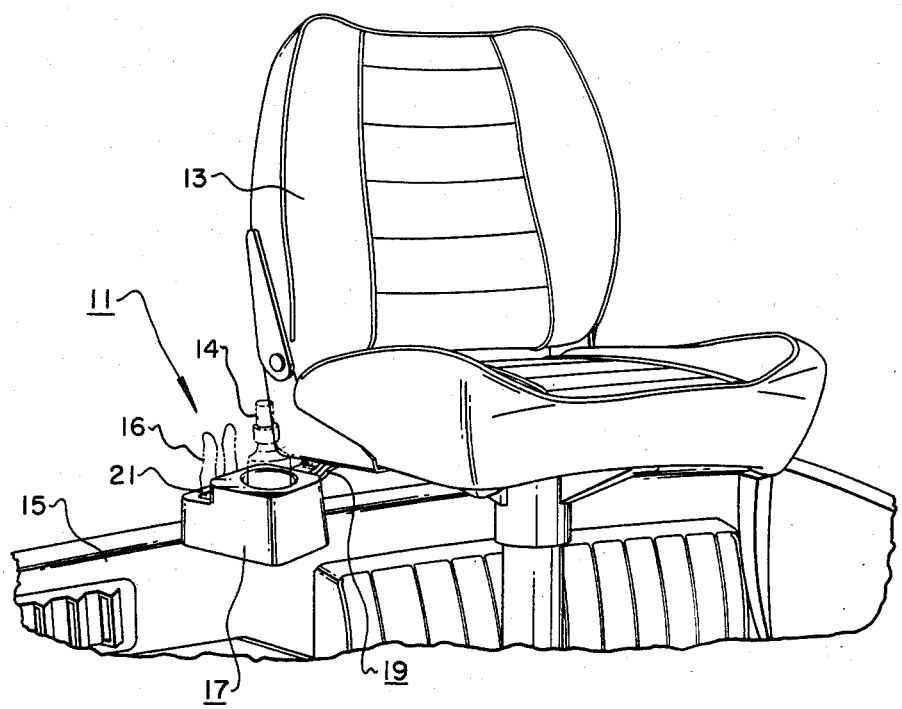
FIG. 1 is a perspective view of one embodiment of the invention in an installed configuration.
Figure 2:
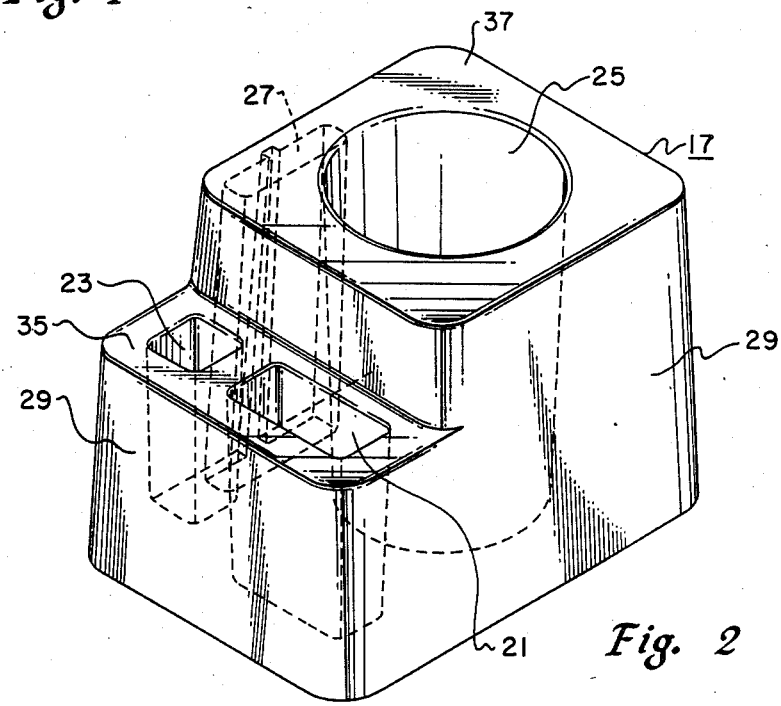
FIG. 2 is an isometric view of the main body of the embodiment of FIG. 1.
Figure 3:
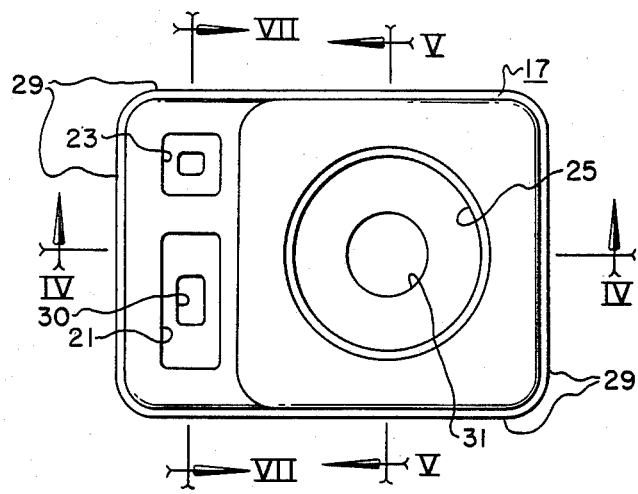
FIG. 3 is a top view of the main body of FIG. 2.
Figure 4:
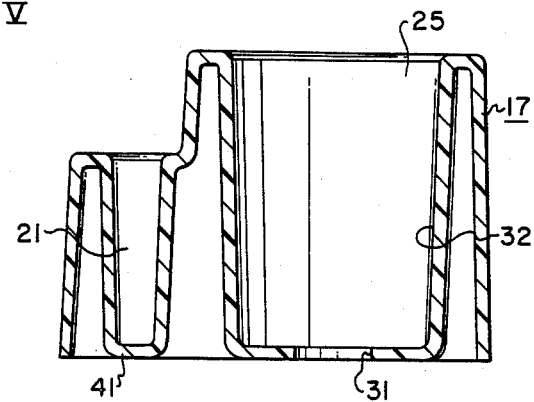
FIG. 4 is a cross-sectional view taken at lines IV—IV of FIG. 3.
Figure 5:
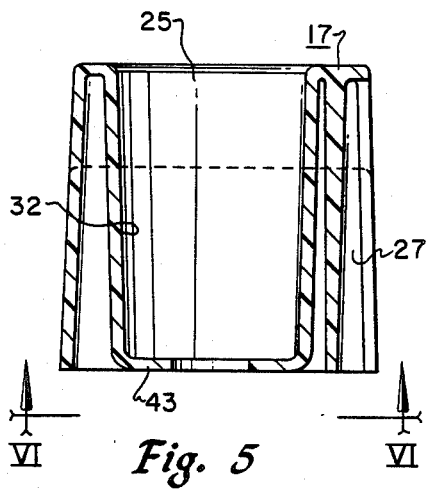
FIG. 5 is a cross-sectional view taken at lines V—V of FIG. 3.

It is to this problem that the device of the present invention, shown in FIG. 1, pertains. In a preferred embodiment, the accessory 11 is mounted to the underside of a seat 13, of the type often found on bass fishing boats 15. The accessory has two components; a body 17 and a mounting bracket 19.

The body 17, shown in FIGS. 2-8, has a top wall 37 and a lower top wall 35. Four side walls 29 are connected to the top walls 35, 37 to form a box-like configuration. The corners and edges of the walls are rounded to preclude the possibility of injury or snagging. A cylindrical cavity 25 is disposed within the top wall 37. The cavity 25 has a side wall 32 and a bottom wall 43, and is large enough to contain, for example, a soft drink can or a bottle of odorizer 14, which is used to scent the bait. Due to the fact that there often is a slight discrepancy in size between whatever cans and bottles a fisherman may use, the side wall 32 is slanted inward. Thus the interior of the cavity is shaped like an upside down cone with the pointed end or apex cut off. This allows a can or a bottle to be wedged in place, regardless of its size. The securing of a container 14 by wedging it in place is advantageous since some turbulence in the form of waves may be encountered by the boat. In addition, the cavity 25 is deep enough to contain the majority of the container 14, so only a small portion juts out above the top wall 37, further insuring that the container 14 will remain in place. The cavity 25 has a drain 31 which prevents the accumulation of liquids inside of the accessory. To assist in this drainage function and to reduce the amount of material required in manufacturing, the body 17 has no bottom wall connected to the side walls 29. Instead, a bottom wall 43 closes the bottom end of the cavity 25. Two other cavities 21, 23 that are disposed within the top wall 35 are illustrated. The cavities 21, 23 are rectangular in shape and are appropriately sized to contain whatever hand tools might be convenient for the fisherman to have at his side. Two such tools that might be utilized are a pair of pliers 16 to assist in the removal of hooks, among other things, and clippers (not shown) to cut fishing line. The bottom walls 39, 41 are provided with holes to drain the cavities 21, 23. The cavity 21 is particularly suitable for the containment of a pair of pliers; the hole 30 acts to wedge the pliers in place. Apart from their size and shape, these cavities 21, 23, are similar to the cylindrical cavity 25.

Figure 6:
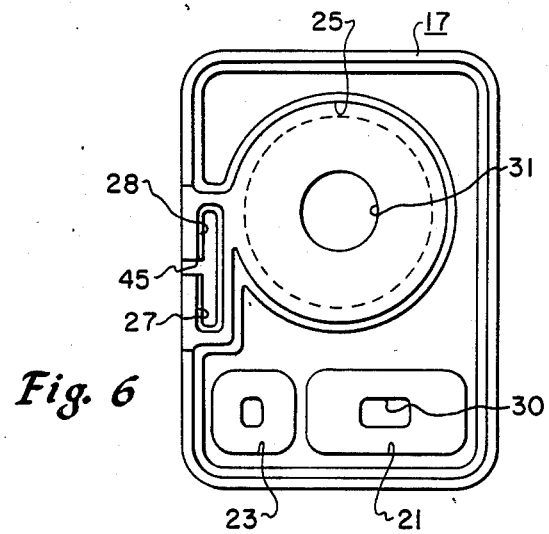
FIG. 6 is a mirror image view of the bottom taken along lines VI—VI of FIG. 5.
Figure 7:
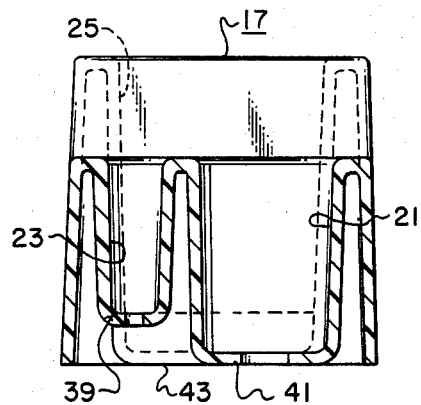
FIG. 7 is a cross-sectional view taken at lines VII—VII of FIG. 3.
Figure 8:
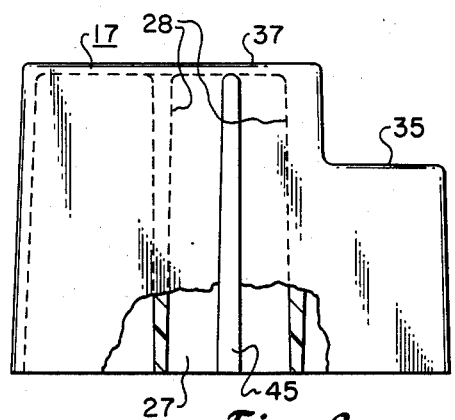
FIG. 8 is a rear view, partly broken away, showing the central slot.
Figure 9:
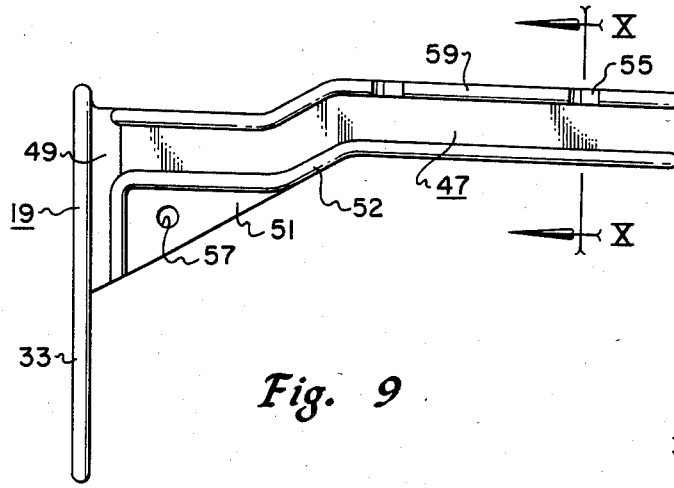
FIG. 9 is a side elevational view of a mounting bracket for affixing to the bottom of the seat in accordance with the embodiment of FIG. 1.
Figure 10:
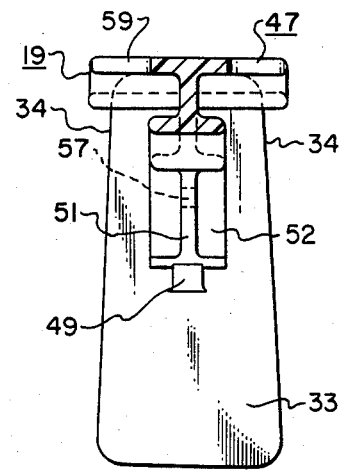
FIG. 10 is a cross-sectional view taken at lines X—X of FIG. 9.
Figure 11:
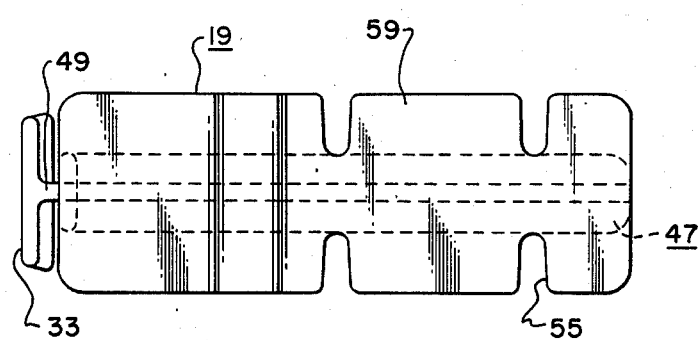
FIG. 11 is a top view of the mounting bracket of FIG. 9.
Figure 12:
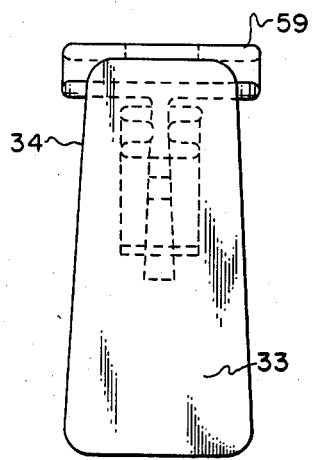
FIG. 12 is a different side elevational view of the mounting bracket.

One of the side walls 29 is split by a central slot 45, that begins at the bottom edge of the side wall 29, travels upward, and almost reaches the top wall 37. The slot 45 is shaped like inverted "V" so that the widest part of the slot 45 is at the bottom edge. A mounting cavity 27 utilizes the same side wall 32 as does the slot 45. This mounting cavity 27 does not penetrate the top wall 37 as does the other cavities, nor does the cavity 27 have a bottom wall but is in fact open on the bottom. The mounting cavity 27 is positioned on the interior surface of the side wall 29, such that the cavity is centrally located on the slot 45. The inner walls 28 of the mounting cavity 27 are slanted inward to create a wedge-shaped cavity. The portion of the side wall 29 which is shared by the rectangular cavity 27 is reinforced as shown in FIG. 6.

The horizontal mounting bracket 19 (see FIGS. 9-12) is used to mount the main body underneath the fisherman's seat 13. The bracket 19 has a mounting plate 59 that is fixed to the underside of seat 13 with screws (not shown) fitted into slots, or apertures, 55. The mounting plate 59 is structurally reinforced by a web and a bottom flange 52, such that an I-beam 47 is configured. The mounting plate 59 is wider than the bottom flange 52 to enable installation of the screws without the bottom flange 52 interfering. The bottom flange 52 makes an approximate 90° bend at its end. In the illustrated embodiment, the angle is not exactly equal to 90° because the side walls 29 are flared outward slightly. Attached to the bent portion of the bottom flange 52 is a mounting web 49 that is shaped to fit into slot 45. Thus the mounting web 49 thickens from the mounting plate 59 to the bottom flange 52. The farther up into the slot 45 the web 49 travels, the tighter the web 49 becomes wedged in place, creating a wedge-locking effect. To prevent the web 49 from laterally escaping from the slot 45, a retaining plate 33 is attached to the web 49. When the body 17 is installed onto the mounting bracket 19, the retaining plate 33 is on the opposite side of the side wall 29 from the bottom flange 52. The retaining plate 33 is sized at its side edges 34 to matingly fit into mounting cavity 27, in a manner similar to that of the slot-web configuration. Thus the body 17 is securely mounted onto the bracket at two places; at the slot and at the mounting cavity. Both locations utilize the wedge-locking effect. In the bend of the bottom flange 52 is a stiffening web 51 used to further increase stiffness of the I-beam 47. The stiffening web 51 has a hole 57 which allows wire or hooks to feed through enabling the fisherman to hang a towel (not shown) that is conveniently located under his chair 13.

Figure 13:
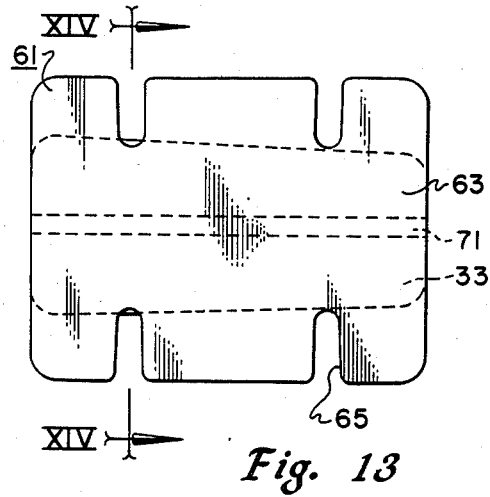
FIG. 13 is a top view of a vertical mounting bracket.
Figure 14:
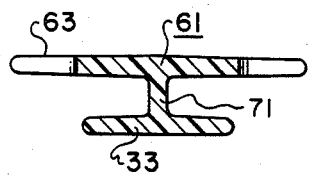
FIG. 14 is a cross-sectional view taken at the lines XIV—XIV of FIG. 13.
Figure 15:
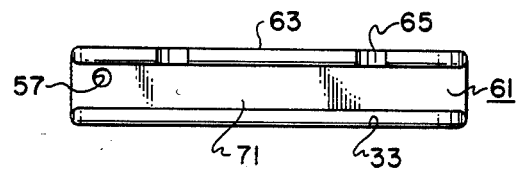
FIG. 15 is a side elevational view of the mounting bracket of FIG. 13.

An alternate type of mounting bracket is shown in FIGS. 13-15. This mounting bracket 61 allows mounting of the body 17 to a vertical surface (not shown). The bracket is in the shape of a short I-beam section with the mounting plate 63 being of larger width than the bottom flange 67 to facilitate insertion of screws into slots, or apertures, 65. The web 71 has a hole 57 to allow the user to hang a towel similar to the horizontal mounting bracket 19. Note that the web 49 is not wedge-shaped to fit the slot 45. Instead it is sized to fit somewhat loosely into the slot 45. The retention due to wedge-locking occurs with the retaining plate 33 which locks into the mounting cavity 27. Note also that if in the embodiment illustrated in FIG. 2, the retaining plate 33 was sized too small so that its sides 34 did not contact the interior of the mounting cavity 27, then the fit of the wedge-shaped web 49 into the similarly shaped slot 45 would ordinarily be sufficient to mount the body 17. These embodiments of the mounting bracket illustrate that while both a wedge-shaped web and plate are preferred, the absence of either wedge-locking feature will not render the device inoperable.

Figure 16:
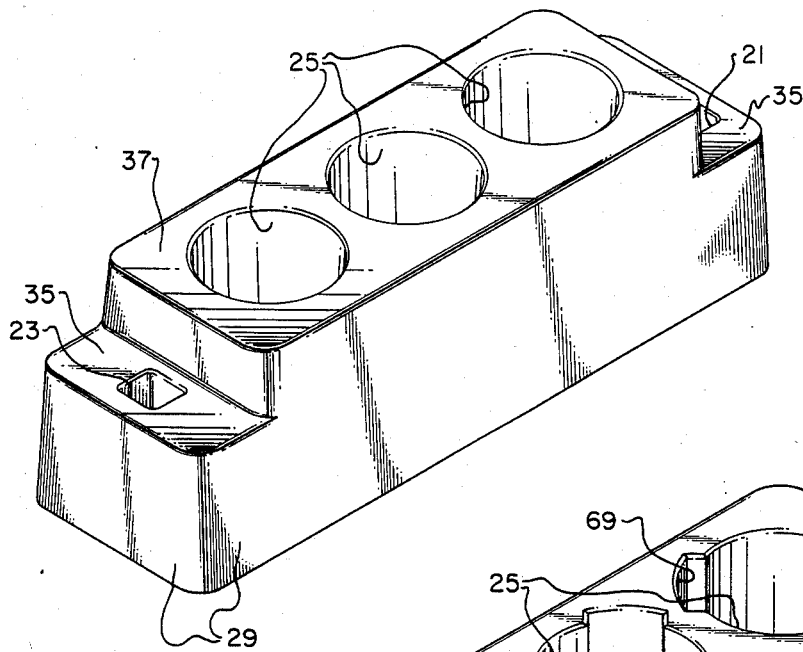
FIG. 16 is an isometric view of another embodiment of the invention.

The embodiment shown in FIG. 16 illustrates that three cylindrical containers can be provided for. Also, the cavities 21, 23 used for containing hand tools need not be grouped together.

Figure 17:
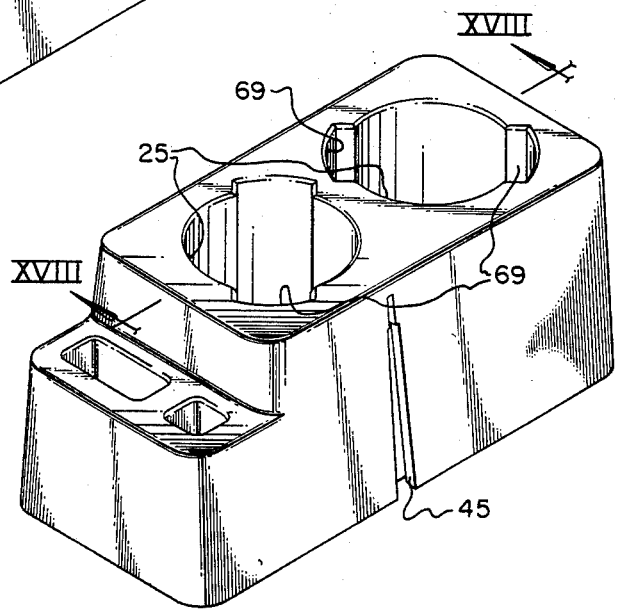
FIG. 17 is an isometric view of another embodiment of the invention.
Figure 18:
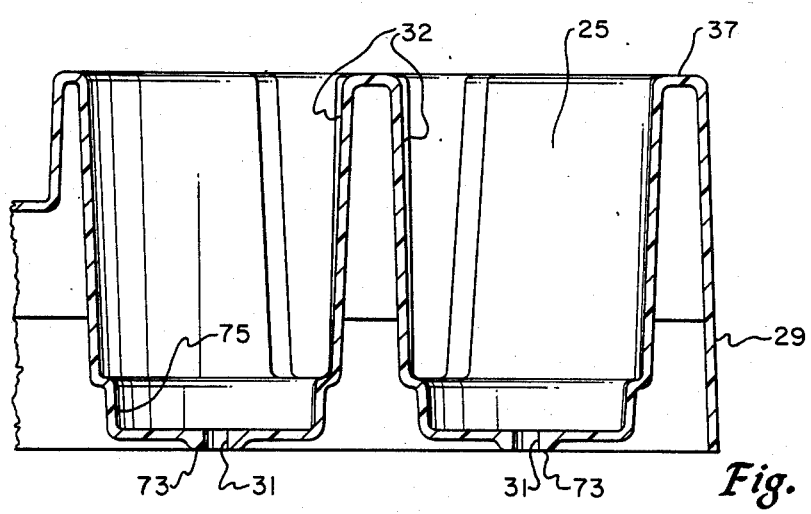
FIG. 18 is a cross-sectional view taken at the lines XVIII—XVIII of FIG. 17.

Another embodiment of the invention is shown in FIGS. 17 and 18. This embodiment has two cylindrical cavities 25 for holding two containers. The cylindrical cavities 25 are fitted with keyways 69. The keyways 69 allow the device to contain certain types of equipment, in particular odorizers, which come in a rectangular, rather than a cylindrical shape. In addition, the diameter of the bottom of the cylindrical cavities is stepped down slightly, forming a bottom well 75, to further increase the capabilities of firmly holding containers. Some odorizers are available in small diameter containers; these will fit snuggly into the bottom well 75 of the cylindrical cavities. Both the keyways 69 and the bottom wells 75 further increase the versatility of the accessory device.

The components can be fabricated from a variety of materials. Since the device is designed to be used in a marine environment, a non-corrosive material such as thermoplastic is preferred.

Installation of the device is simple. After selecting a convenient place or places to install the device, a suitable mounting bracket is chosen. Assuming the fisherman wants the accessory by his chair, the horizontal mounting bracket 19 is placed under the chair 13 such that the mounting plate 59 contacts the underside of the chair. Screws are inserted through slots 55 and into the chair. Once mounted the retaining plate 33 and the web 49 protrude free and clear from the seat. After the bracket is securely fixed to the seat, the body 17 is aligned relative to the bracket 19 such that the slot 45 opening is just above the top portion of the web 49 and the retaining plate 33 is just under the mounting cavity 27. Then the body 17 is firmly pushed down until there is a snug fit. Any number of mounting brackets can be installed throughout the boat enabling the fisherman to change locations simply by pulling up on the body, moving to the new location, and reinstalling the body on the new bracket. This further increases the convenience to the fisherman who does not have to make several trips to carry his equipment, especially since movement in a small boat may invite capsizing.

Once the main body is installed in the bracket, the side wall forming one side of the rectangular cavity acts to reinforce the bracket by filling the gap between the retaining plate and the bottom flange of the I-beam. This further adds structural strength and integrity. This type of structural reinforcement is unnecessary for the vertical mounting bracket because of the I-beam configuration. There is no force on the end of an I-beam as for the horizontal mounting bracket; the force is instead axial.

Another method of mounting is where the body 17 is mounted to the deck by putting screws through drain holes 31 of the cylindrical cavities 25. The bottom wall is reinforced 73 around the drain hole 31, the size of which has been decreased to prevent the screw from slipping through, to allow deck mounting. The reinforced wall 73 is flush with the bottom of side wall 29 for this very purpose (see FIG. 18.).

With the accessory device of the present invention, several advantages are realized. The wedge-locking feature ensures a snug mounting of the device without sacrificing the versatility of allowing a quick change of mounts. The body is securely locked onto the mounting bracket both at the web-slot juncture and at the retaining plate-mounting cavity juncture. Yet by firmly grasping the body and pulling upward, the accessory device is free to be moved, with all of its contents, to a new location. The wedge-locking feature is also utilized to firmly hold containers of many different sizes.

The foregoing disclosure and the showings made in the drawings are merely illustrative of the principles of this invention are not to be interpreted in a limiting sense.

What is claimed is:

1. An accessory for holding containers and hand tools on a boat used for recreational purposes, comprising:
   a. a main body having a top wall and a plurality of side walls coupled to said top wall, said main body further comprising:
      i. at least one cylindrical cavity disposed within said top wall, said cylindrical cavity having a side wall and a bottom wall, said cylindrical cavity being of sufficient diameter and depth to contain a cylindrical container such as might be utilized on said boat;
      ii. at least one cavity disposed within said top wall, said cavity having side walls and a bottom wall, said cavity being of sufficient size and shape to contain hand tools such as might be utilized on said boat for fishing purposes;
      iii. a narrow wedge-shaped slot in one of said main body side walls, said slot beginning at the bottom edge of said main body side wall and traversing upward toward said top wall in a tapered manner;
   b. a mounting bracket further comprising:
      i. a mounting plate with apertures suitable for receiving fasteners to affix said mounting bracket to the interior of said boat;
      ii. a mounting web coupled to said mounting plate, wherein said web is shaped and sized to matingly engage with said slot;
      iii. means for retaining said web within said slot.

2. The device of claim 1 wherein:
   a. said main body further comprises a mounting cavity disposed adjacent to and interior of said slot, said mounting cavity being centered on said slot, and having an opening in the bottom and an interior which forms a wedge shape;
   b. said means for retaining said web comprises a flat plate sized and shaped to matingly fit within said mounting cavity.

3. The device of claim 1 wherein said mounting plate is perpendicular to said web to form a horizontal mounting bracket.

4. The device of claim 1 wherein said mounting plate is parallel to said web to form a vertical mounting bracket.

5. The device of claim 1 wherein said cylindrical cavity has a small hole suitable for receiving fasteners, in said bottom wall for deck mounting said body.

6. The device of claim 1 wherein the side wall of said cylindrical cavity forms an inverted truncated cone.

7. The device of claim 6 wherein the side wall of at least one cylindrical cavity has two diametrically opposed keyways sized and shaped to retain a rectangular container such as might be utilized on said boat for fishing.

8. The device of claim 6 wherein:

a. said main body has at least two of said cylindrical cavities,
b. each of said cylindrical cavities has two diametrically opposed keyways sized and shaped to retain a rectangular container such as might be utilized on said boat for fishing.

9. The device of claim 7 wherein said cylindrical cavity has a well in the bottom of said cylindrical cavity, said well having a smaller diameter than the diameter of said cylindrical cavity side wall.

10. The device of claim 9 wherein said mounting bracket has a small hole through which means for hanging towels may be placed.

11. The device of claim 1 wherein said cavity for retaining hand tools has a hole in said bottom wall to allow said hand tools to be wedged into a secure position.

12. An accessory for holding containers and hand tools on a boot used for recreational purposes, comprising:
   a. a main body having a top wall and a plurality of side walls coupled to said top wall, said main body further comprising:
      i. at least one cylindrical cavity disposed within said top wall, said cylindrical cavity having a side wall and a bottom wall, said cylindrical cavity being of sufficient diameter and depth to contain a cylindrical container such as might be utilized on said boat;
      ii. at least one cavity disposed within said top wall, said cavity having side walls and a bottom wall, said cavity being of sufficient size and shape to cotnain hand tools such as might be utilized on said boat for fishing purposes;
      iii. a narrow slot in one of said main body side walls, said slot beginning at the bottom edge of said main body side wall and traversing upward toward said top wall;
      iv. a mounting cavity disposed adjacent to and interior of said slot, said mounting cavity being centered on said slot, and having an opening in the bottom and an interior which forms a wedge shape;
   b. a mounting bracket further comprising:
      i. a mounting plate with apertures suitable for receiving fasteners to affix said mounting bracket to the interior of said boat;
      ii. a mounting web coupled to said mounting plate, wherein said web is shaped and sized to engage with said slot;
      iii. a flat plate coupled to said web and shaped and sized to matingly fit within said mounting cavity.

13. The device of claim 12 wherein said mounting plate is perpendicular to said web to form a horizontal mounting bracket.

14. The device of claim 12 wherein said mounting plate is parallel to said web to form a vertical mounting bracket.

15. The device of claim 12 wherein the side wall of said cylindrical cavity forms an inverted truncated cone.

16. The device of claim 15 wherein the side wall of at least one cylindrical cavity has two diametrically opposed keyways sized and shaped to retain a rectangular container such as might be utilized on said boat for fishing.

17. The device of claim 15 wherein:
   a. said main body has at least two of said cylindrical cavities,
   b. each of said cylindrical cavities has two diametrically opposed keyways sized and shaped to retain a rectangular container such as might be utilized on said boat for fishing.

18. The device of claim 16 wherein said cylindrical cavity has a well in the bottom of said cylindrical cavity, said well having a smaller diameter than the diameter of said cylindrical cavity side wall.

19. The device of claim 18 wherein said mounting bracket has a small hole through which means for hanging towels may be placed.

20. The device of claim 19 wherein said cavity for retaining hand tools have a hole in said bottom wall to allow said hand tools to be wedged into a secure position.

* * * * *